(12) United States Patent  
Miyamoto

(10) Patent No.: US 7,484,762 B2
(45) Date of Patent: Feb. 3, 2009

(54) FRAME FOR VEHICLE

(75) Inventor: Masatoshi Miyamoto, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 338 days.

(21) Appl. No.: 11/097,411

(22) Filed: Mar. 31, 2005

(65) Prior Publication Data

US 2005/0218643 A1  Oct. 6, 2005

(30) Foreign Application Priority Data

Mar. 31, 2004  (JP) ............................ 2004-106811

(51) Int. Cl.
*B62D 21/03* (2006.01)
(52) U.S. Cl. ..................................... 280/797
(58) Field of Classification Search ................. 280/781, 280/797; 180/311, 312, 291
See application file for complete search history.

(56) References Cited

U.S. PATENT DOCUMENTS

| | | | | |
|---|---|---|---|---|
| 3,945,463 A * | 3/1976 | Okano et al. | ................ | 184/6.13 |
| 4,694,929 A * | 9/1987 | Sugimoto | .................... | 180/311 |
| 4,706,774 A * | 11/1987 | Tsuboi | ........................ | 180/227 |
| 4,809,999 A * | 3/1989 | Tozawa et al. | ............ | 280/281.1 |
| 4,852,678 A * | 8/1989 | Yamaguchi | .................. | 180/219 |
| 6,412,856 B1 * | 7/2002 | Kajikawa et al. | ....... | 296/203.01 |
| 6,502,658 B1 * | 1/2003 | Nagashii | ..................... | 180/219 |
| 6,682,096 B2 * | 1/2004 | Kajikawa et al. | ............ | 280/797 |
| 2004/0140693 A1* | 7/2004 | Gibbianelli et al. | .... | 296/203.01 |
| 2004/0182634 A1* | 9/2004 | Adachi et al. | ............... | 180/312 |

FOREIGN PATENT DOCUMENTS

| | | | | |
|---|---|---|---|---|
| JP | 02095997 | A | * | 4/1990 |
| JP | 03266786 | A | * | 11/1991 |
| JP | 05039077 | A | * | 2/1993 |
| JP | 05301592 | A | * | 11/1993 |
| JP | 06171570 | A | * | 6/1994 |
| JP | 2000-142528 | | | 5/2000 |

* cited by examiner

*Primary Examiner*—Faye M. Fleming
(74) *Attorney, Agent, or Firm*—Hogan & Hartson LLP

(57) ABSTRACT

A frame for a vehicle includes a first frame member having a square tube-like joint end portion and a second frame member having a square tube-like joint end portion. The joint end portion of the first frame member and the joint end portion of the second frame member are butt-welded to each other. The joint end portions of the first and second frame members each has circumferentially continuous first-fourth edges and the first-fourth edges are inclined when the joint end portions are viewed radially in any direction.

20 Claims, 11 Drawing Sheets

FRAME FOR VEHICLE

BACKGROUND OF THE INVENTION

1. Field of the Invention

This invention relates to a frame used in a vehicle, such as a motorcycle, and particularly to the structure of a welded joint for joining two frame members.

2. Description of Related Art

A frame for a motorcycle supports main components such as an engine, a front fork and a rear arm, and has the function of receiving impulsive loads or fatigue failure loads transmitted from the front fork and the rear arm during running.

Since this kind of frame requires high strength and rigidity as well as light weight, a conventional frame includes a plurality of rectangular tube-like frame members which are welded to each other and assembled. In the frame of this type, joint end portions of the plurality of frames are cut obliquely to secure the welding length between the joint end portions, so as to ensure the strength of the welded joint portions.

In the frame disclosed above, the joint end portion of the frame member is cut obliquely when the frame is viewed from the side. Therefore, when the left and right side edges of the joint end portion are inclined to the axis of the frame member, the overall length of the side edges becomes larger compared with when these side edges cross the axis of the frame member at right angles.

However, with the conventional frame, there is nothing mentioned regarding the shapes of the front and rear ends of the frame member. Therefore, the welding length of the welded joint portion is earned only by the left and right side edge portions and thus the welding length of the welded joint portion is hardly sufficient.

An advantage of the present invention is to provide a frame for a vehicle capable of securing a sufficient welding length between joint end portions without complicating the shapes of the joint end portions of the first and second frame members.

SUMMARY OF THE INVENTION

In order to achieve the foregoing advantage, the frame for a vehicle according to one embodiment of this invention includes a first frame member having a square tube-like joint end portion and a second frame member having a square tube-like joint end portion. The joint end portion of the first frame member and the joint end portion of the second frame member are butt-welded to each other. The joint end portions of the first and second frame members have circumferentially continuous first-fourth edges, respectively, and the first-fourth edges are inclined when the joint end portions are viewed radially in any direction.

According to an embodiment of the present invention, the circumferential length of the joint end portion can be increased without complicating the shapes of the first-fourth edges. Therefore, a sufficient welding length can be secured between the joint end portions, improving the welding strength of the first and second frame members.

DETAILED DESCRIPTION OF THE INVENTION

Now, a first embodiment of the present invention will be described with reference to FIG. 1 through FIG. 10 in which the present invention is applied to a motorcycle.

Figure 1:
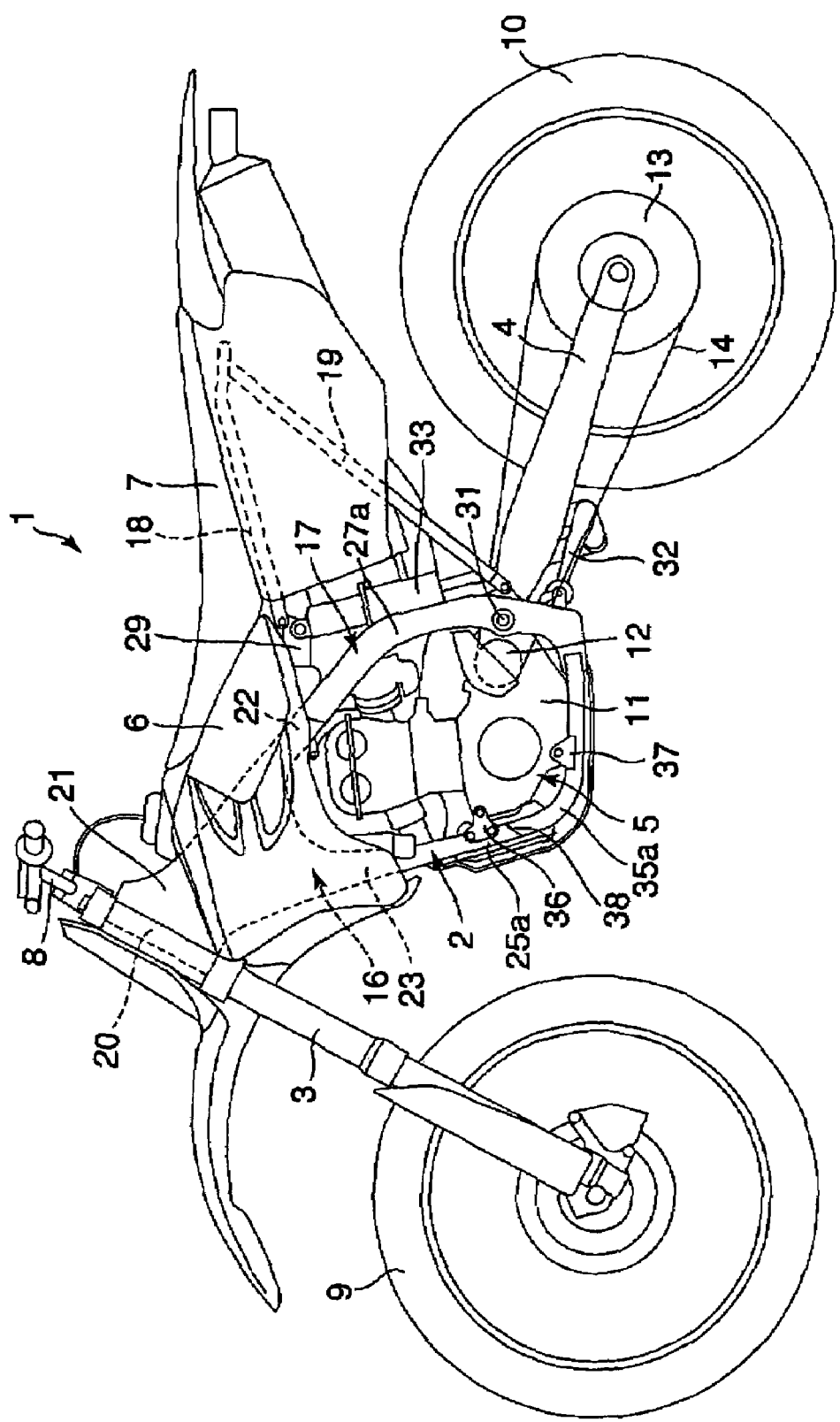
FIG. 1 is a side view of a motorcycle according to a first embodiment of the present invention.

FIG. 1 shows a motorcycle 1, for example, for motocross races. The motorcycle 1 is provided with a frame 2 of a cradle type. The frame 2 supports a front fork 3; a rear arm 4; a water-cooled, four-stroke, single-cylinder engine 5; a fuel tank 6; and a seat 7.

The front fork 3 is controlled by a bar handle 8 for steering and supports a front wheel 9. The rear arm 4 extends rearward from the frame 2 and supports, at its rear end, a rear wheel 10. The engine 5 is designed to drive the rear wheel 10 and has a drive sprocket 12 at the rear end of a crankcase 11. A chain 14 is stretched between the drive sprocket 12 and a driven sprocket 13 of the rear wheel 10.

The fuel tank 6 is located directly above the engine 5. The seat 7 extends rearward of the fuel tank 6 approximately horizontally from the upper surface of the fuel tank 6.

Figure 2:
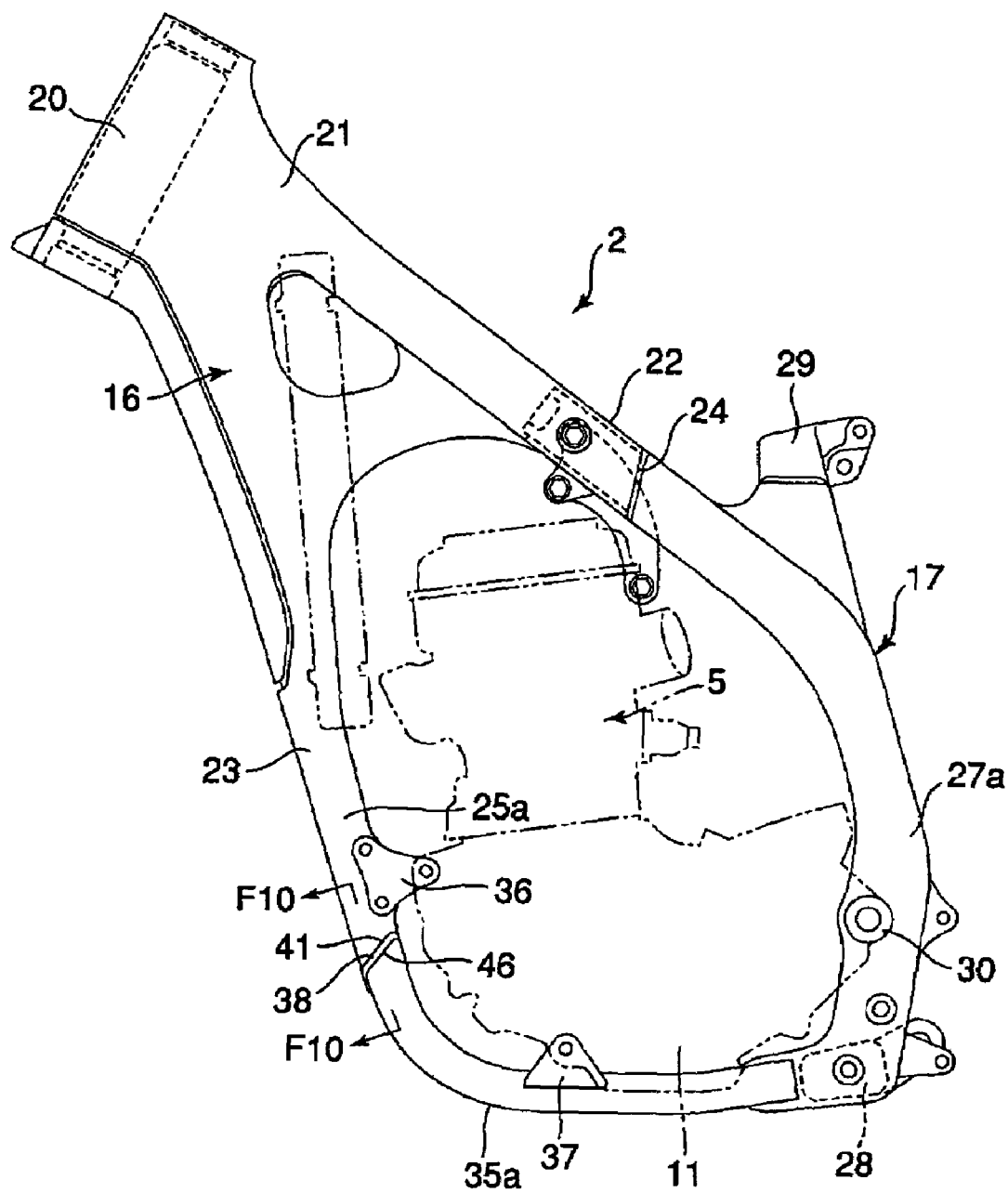
FIG. 2 is a side view of a frame according to the first embodiment of the present invention.
Figure 3:
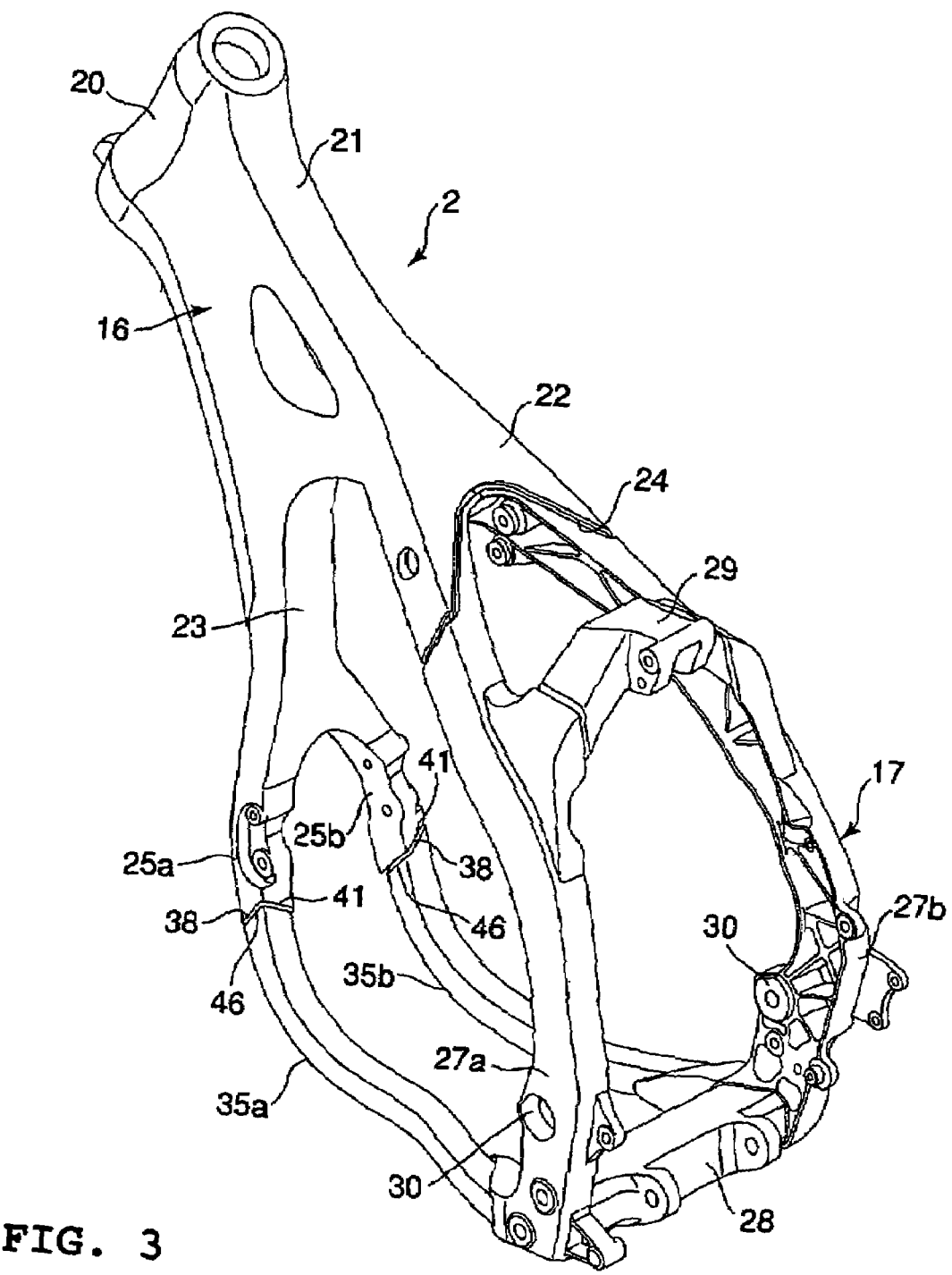
FIG. 3 is a perspective view of the frame according to the first embodiment of the present invention.

As shown in FIG. 1 through FIG. 3, the frame 2 is provided with a first frame section 16, a second frame section 17, left and right seat rails 18 and left and right seat pillar tubes 19.

The first frame section 16 is a cast product of an aluminum alloy and provided with a steering head pipe 20 and a gusset portion 21. The steering head pipe 20 is located at the forward end of the frame 2 and supports the front fork 3.

The gusset portion 21 extends obliquely downward toward the rear from the steering head pipe 20 and is in a hollow, box-like shape elongated in the direction of height of the frame 2. The gusset portion 21 has a connecting portion 22 protruding obliquely downward toward the rear, and one first down tube 23 protruding downward.

The connecting portion 22 is in the shape of a square box expanded laterally of the vehicle toward the rear, and formed, at the rear end, with an opening 24 which is open rearward. The first down tube 23 is in the shape of a rectangular tube of a square cross-section and has, at its lower ends, a pair of forked connecting arm portions 25a, 25b. The connecting arm portions 25a, 25b protrude downward along the first down tube 23 and disposed parallel to each other with a space in the lateral direction of the vehicle.

The second frame section 17 is provided with a pair of rear arm brackets 27a, 27b, a cross member 28 and a rear cushion bracket 29. The rear arm brackets 27a, 27b are formed from forged products of aluminum alloy. The rear arm brackets 27a, 27b stand behind the first down tube 27 in the direction of the height of the frame 2 and are disposed parallel to and separate from each other laterally of the vehicle. The rear arm brackets 27a, 27b have bosses 30, respectively. The forward ends of the rear arm 4 are placed between the bosses 30 and supported by the bosses 30 through a pivot shaft 31.

The upper edges of the rear arm brackets 27a, 27b extend toward the connecting portion 22 of the first frame section 16. The upper ends of the rear arm brackets 27a, 27b are fitted in an opening 24 of the connecting portion 22 and welded to the edge of the opening 24.

The cross member 28 is formed from extruded aluminum alloy into the shape of a rectangular tube. The cross member 28 connects the rear arm brackets 27a, 27b at the lower ends. The cross member 28 is located below the rear arm 4, and a link mechanism 32 extends across the space between the rear end of the cross member 28 and the rear arm 4.

The rear cushion bracket 29 is a cast product of aluminum alloy and in the shape of a rectangular tube. The rear cushion bracket 29 connects the upper parts of the rear arm brackets 27a, 27b. One hydraulic shock absorber 33 extends between the rear cushion bracket 29 and the link mechanism 32 connected to the rear arm 4.

As shown in FIG. 1, the rear cushion bracket 29 supports the forward end of the seat rail 18. The seat rail 18 extends rearward from the rear cushion bracket 29 and supports the rear half of the seat 7. The seat pillar tube 19 extends between the rear half of the seat rail 18 and the lower parts of the rear arm brackets 27a, 27b and supports the rear end of the seat rail 18.

Figure 4:
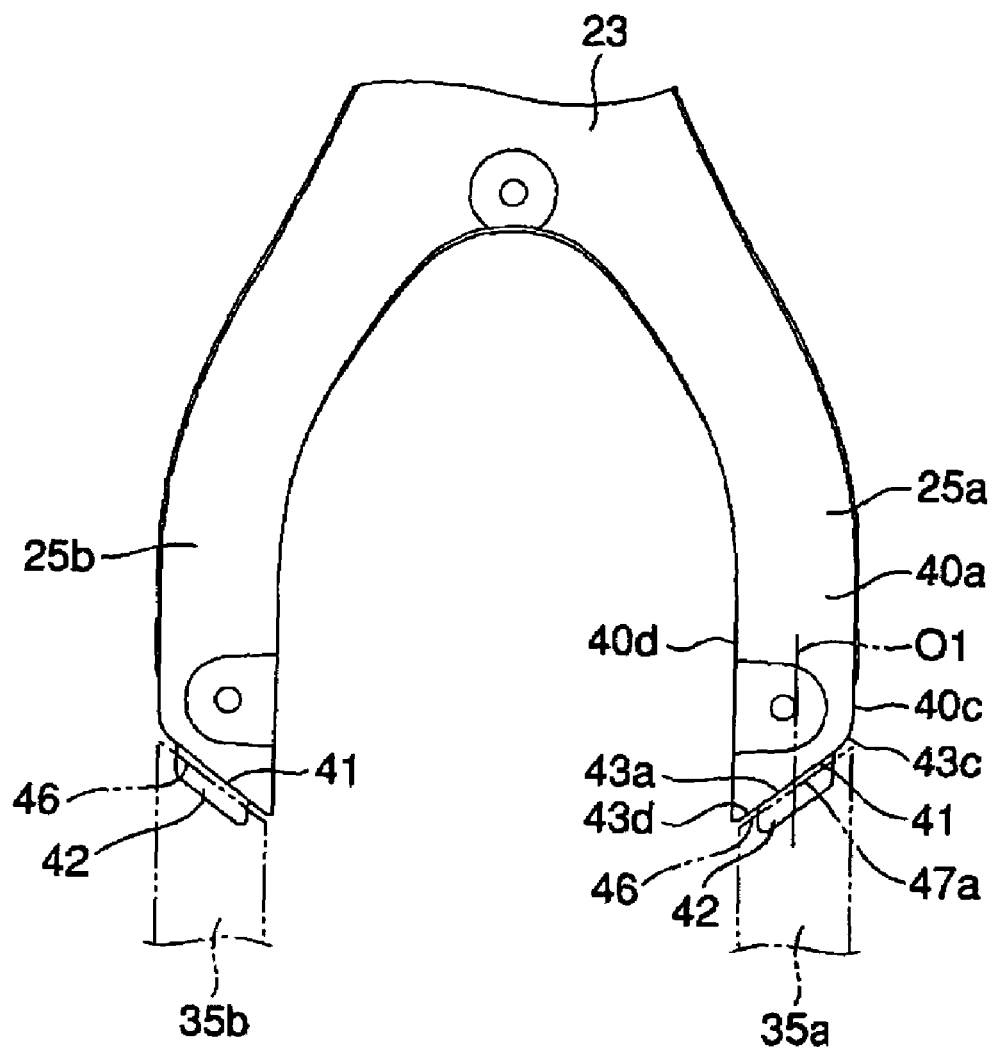
FIG. 4 is a front view of a connecting arm portion of a first down tube in the first embodiment of the present invention.

As shown in FIG. 2 through FIG. 4, the connecting arm portions 25a, 25b of the first down tube 23 and the lower ends of the rear arm brackets 27a, 27b are connected through left and right second down tubes 35a, 35b. The second down tubes 35a, 35b are formed from extruded aluminum alloy, for example. The forward ends of the second down tubes 35a, 35b are welded to the connecting arm portions 25a, 25b of the first down tube 23. The rear ends of the second down tubes 35a, 35b are welded to the lower ends of the rear arm brackets 27a, 27b. Therefore, the second down tubes 35a, 35b extend longitudinally of the frame 2 and are disposed separate from each other laterally of the vehicle.

The first down tube 23, second down tubes 35a, 35b and rear arm brackets 27a, 27b support the crankcase 11 of the engine 5 so as to be enclosed.

Specifically, as shown in FIG. 2, first engine brackets 36 are attached to the connecting arm portions 25a, 25b of the first down tube 23, respectively. The first engine brackets 36 support the forward end of the crankcase 11. Second engine brackets 37 are attached to the second down tubes 35a, 35b in the middle. The second engine brackets 37 support the lower end of the crankcase 11.

The rear end of the crankcase 11 is placed between the bosses 30 of the rear arm brackets 27a, 27b and is supported by the bosses 30 through a pivot 31. Therefore, the first down tube 23 and the second down tubes 35a, 35b run around the crankcase 11 of the engine 5 from the front to the bottom thereof.

In the frame 2 as described above, a device is made to increase the joint strength between the connecting arm portions 25a, 25b of the first down tube 23 and the second down tubes 35a, 35b. Now, the construction of welded joints 38 for joining the connecting arm portions 25a, 25b and the second down tubes 35a, 35b will be described below by explaining, as an example, a joint portion between the left connecting arm portion 25a and the left second down tube 35a.

Figure 5:
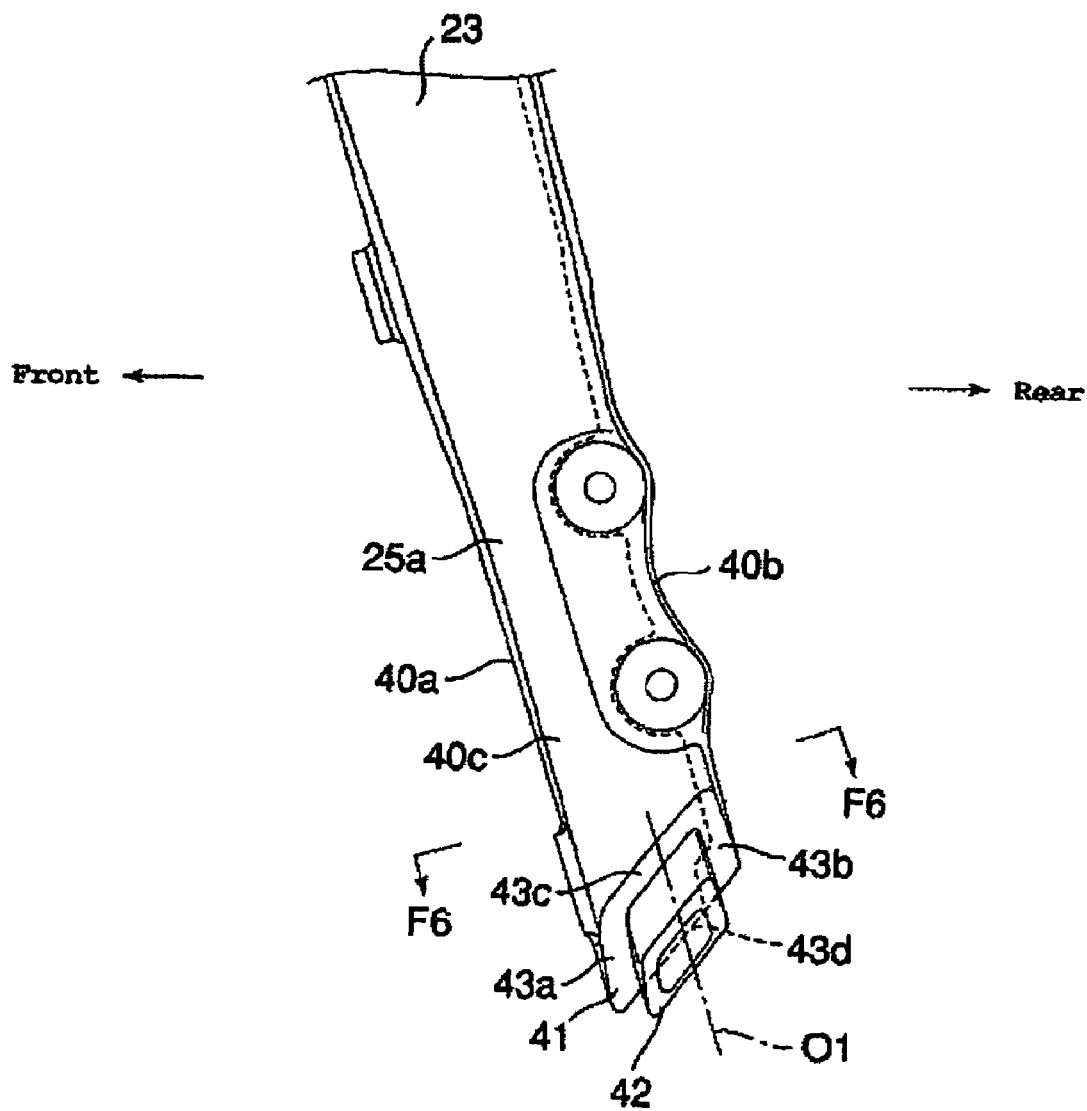
FIG. 5 is a side view of the connecting arm portion according to the first embodiment of the present invention.
Figure 6:
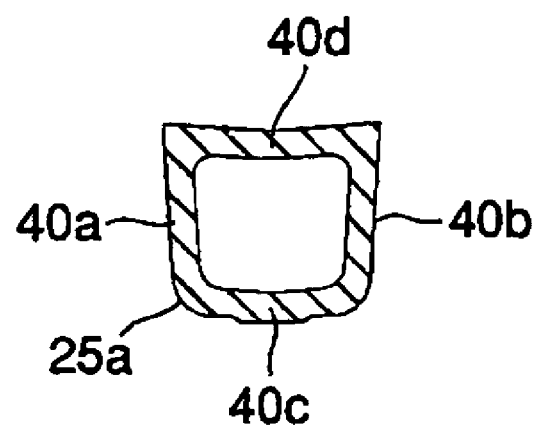
FIG. 6 is a sectional view taken along the line F6-F6 of FIG. 5.
Figure 7:
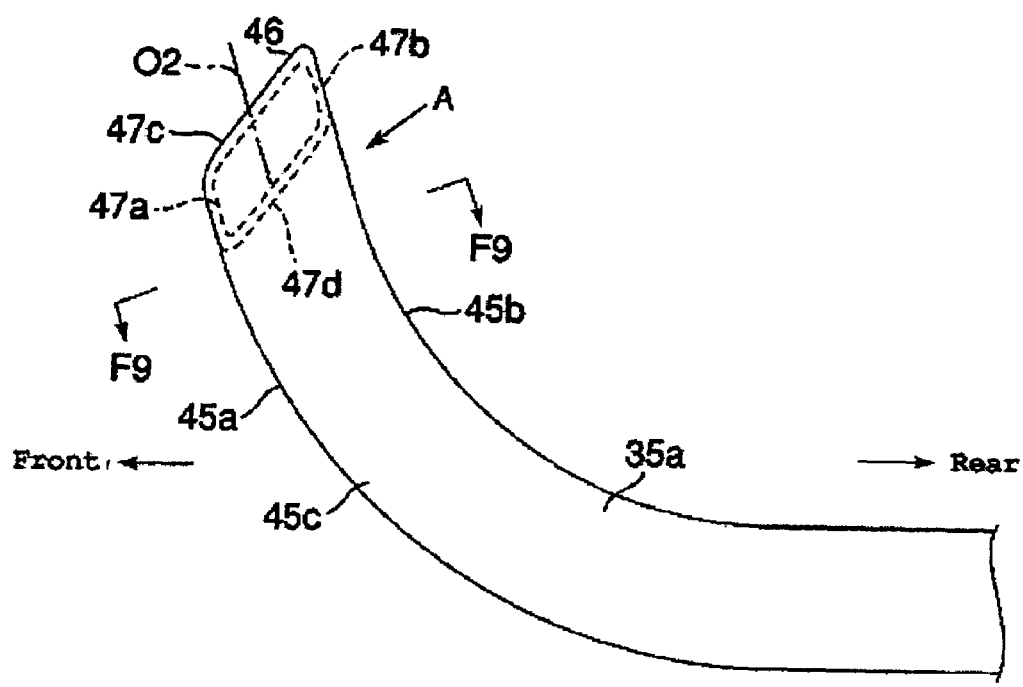
FIG. 7 is a side view of a second down tube according to the first embodiment of the present invention.

The connecting arm portion 25a of the first down tube 23 is a component corresponding to the first frame member of this invention, and has a rectangular tube-like shape with a front wall 40a, a rear wall 40b, and left and right side walls 40c, 40d as shown in FIG. 5 and FIG. 6. The connecting arm portion 25a is provided, at its lower end, with a joint end portion 41 and a projection 42. The joint end portion 41 is in a square shape defined by first-fourth edges 43a-43d, respectively, and directed downward of the first down tube 23.

The first edge 43a of the joint end portion 41 is located at the lower end of the front wall 40a and extends linearly in the lateral direction of the connecting arm portion 25a. The second edge 43b of the joint end portion 41 is located at the lower end of the rear wall 40b and extends linearly in the lateral direction of the connecting arm portion 25a. Therefore, the first edge 43a and the second edge 43b are spaced from each other in the longitudinal direction of the connecting arm portion 25a.

The third edge 43c of the joint end portion 41 is located at the lower end of the left side wall 40c and extends linearly in the longitudinal direction of the connecting arm portion 25a. The fourth edge 43d of the joint end portion 41 is located at the lower end of the right side wall 40d and extends linearly in the longitudinal direction of the connecting arm portion 25a. Therefore, the third edge 43c and the fourth edge 43d are spaced from each other in the lateral direction of the connecting arm portion 25a. In other words, the first edge 43a and the second edge 43b, and the third edge 43c and the fourth edge 43d face each other in the radial direction of the connecting arm portion 25a, respectively.

As shown in FIG. 4 and FIG. 5, the first and second edges 43a and 43b, respectively, are inclined upward toward the outer side (left side) in the lateral direction of the connecting arm portion 25a. Likewise, the third and fourth edges 43c and 43d, respectively, are inclined upward from the front toward the rear of the connecting arm portion 25a. Further, the first-fourth edges 43a-43d, respectively, are located on the same plane radially of the connecting arm portion 25a.

As a result, the square joint end portion 41 defined by the first-fourth edges 43a-43d, respectively, is cut obliquely so as to be directed leftward and rearward of the frame 2 relative to a plane perpendicular to the axis 01 of the connecting arm portion 25a passing through the center of the joint end portion 41. Therefore, the first-fourth edges 43a-43d, respectively, are inclined when the joint end portion 41 is viewed in any direction radially of the connecting arm portion 25a.

The projection 42 protrudes downward from a region surrounded by the first-fourth edges 43a-43d, respectively, of the joint end portion 41. This projection 42 is in a square tube-like shape coaxial to the joint end portion 41.

Figure 9:
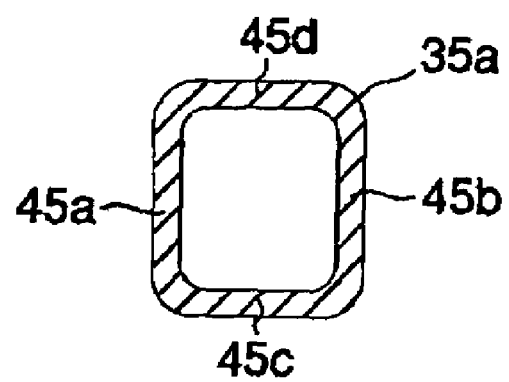
FIG. 9 is a sectional view taken along the line F9-F9 of FIG. 7.

On the other hand, the second down tube 35a is a component corresponding to the second frame member of the present invention and has a rectangular tube-like shape with first-fourth circumferential walls 45a-45d, respectively, as shown in FIG. 9. The second down tube 35a is provided, at the forward end, with an upward joint end portion 46. The joint end portion 46 is in a square shape defined by first-fourth edges 47a-47d, respectively, and configured such that the projection 42 of the foregoing joint end portion 41 is inserted therein.

The first edge 47a of the joint end portion 46 is located at the forward end of the first circumferential wall 45a and extends linearly in the lateral direction of the second down tube 35a. The second edge 47b of the joint end portion 46 is located at the forward end of the second circumferential wall 45b and extends linearly in the lateral direction of the second down tube 35a. Therefore, the first edge 47a and the second edge 47b are spaced from each other in the longitudinal direction of the second down tube 35a.

The third edge 47c of the joint end portion 46 is located at the forward end of the third circumferential wall 45c and extends linearly in the longitudinal direction of the second down tube 35a. The fourth edge 47d of the joint end portion 46 is located at the forward end of the fourth circumferential wall 45d and extends linearly in the longitudinal direction of the second down tube 35a. Therefore, the third edge 47c and the fourth edge 47d are spaced from each other in the lateral direction of the second down tube 35a. In other words, the first edge 47a and the second edge 47b, and the third edge 47c and the fourth edge 47d face each other in the radial direction of the second down tube 35a, respectively.

Figure 8:
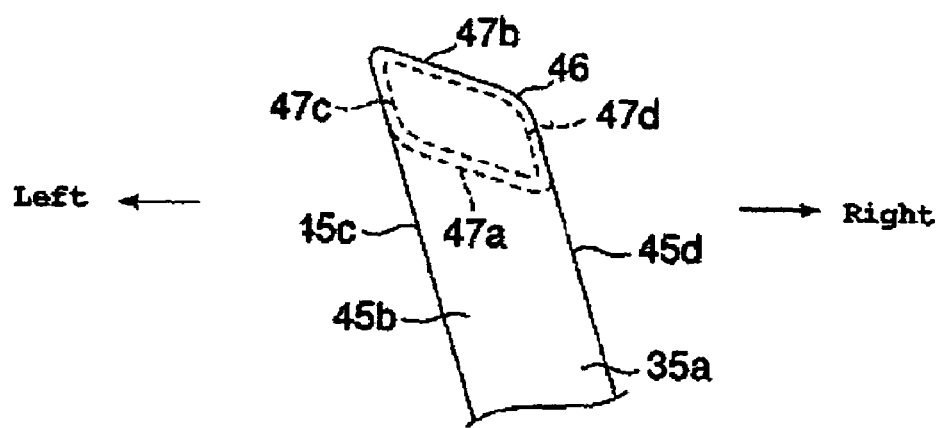
FIG. 8 is a plan view of the second down tube as seen in the direction of the line A of FIG. 7.

As shown in FIG. 4 and FIG. 8, the first and second edges 47a and 47b, respectively, are inclined upwardly toward the outer side (left side) in the lateral direction of the second down tube 35a. Likewise, the third and fourth edges 47c and 47d, respectively, are inclined upward toward the rear of the second down tube 35a. Further, the first-fourth edges 47a-47d, respectively, are located on the same plane radially of the second down tube 35a.

As a result, the square joint end portion 46 defined by the first-fourth edges 47a-47d, respectively, is cut obliquely so as to be directed rightward and forward of the frame 2 relative to a plane perpendicular to the axis 02 of the second down tube 35a passing through the center of the joint end portion 46. Therefore, the first-fourth edges 47a-47d, respectively, are inclined when the joint end portion 46 is viewed in any direction radially of the second down tube 35a.

In the condition in which the projection 42 of the connecting arm portion 25a is inserted in the joint end portion 46 of the second down tube 35, the first-fourth edges 43a-43d, respectively, of the joint end portion 41 and the first-fourth edges 47a-47d, respectively, of the joint end portion 46 face each other so as to be parallel, respectively, and small clearances are formed to absorb dimensional errors between them.

Figure 10:
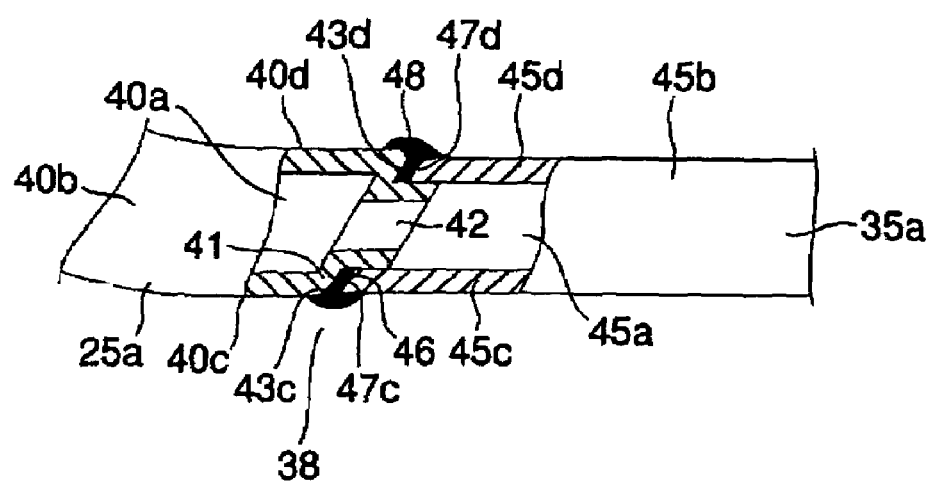
FIG. 10 is a sectional view taken along the line F10-F10 of FIG. 2.

As shown in FIG. 10, the connecting arm portion 25a and the second down tube 35a are welded throughout the circumference, with their joint end portions 41, 46 butted against each other. As a result, a welding bead 48 is formed between the joint end portions 41, 46, and the connecting arm portion 25a and the second down tube 35a are joined integrally. In this case, the projection 42 of the connecting arm portion 25a acts as a backing strip for closing the clearance from the inner side of the second down tube 35a.

According to the first embodiment of the present invention as described above, the first-fourth edges 43a-43d, respectively, defining the joint end portion 41 of the connecting arm portion 25a are inclined when the joint end portion 41 is viewed in any direction radially of the connecting arm portion 25a. Likewise, the first-fourth edges 47a-47d, respectively, defining the joint end portion 46 of the second down tube 35a are inclined when the joint end portion 46 is viewed in any direction radially of the second down tube 35a.

Therefore, the first-fourth edges 43a-43d, respectively, of the joint end portion 41 become longer compared with when these first-fourth edges 43a-43d, respectively, are located on a plane perpendicular to the axis 01. Likewise, the first-fourth edges 47a-47d, respectively, of the joint end portion 46 become longer compared with when these first-fourth edges 47a-47d, respectively, are located on a plane perpendicular to the axis 02.

As a result, the circumferential lengths of the joint end portions 41, 46 are increased and the welding length between the joint end portions 41, 46 and thus the length of the welding bead 48 can be sufficiently secured. This improves the strength of the welded joints 38 for joining the first down tube 23 and the second down tubes 35a, 35b.

In addition, the first-fourth edges 43a-43d, respectively, of the joint end portion 41 and the first-fourth edges 47a-47d, respectively, of the joint end portion 46 are located on the same planes, respectively. Therefore, the joint end portions 41, 46 each have a simple shape with no irregularities, and the welding length between the joint end portions 41, 46 can be secured without complicating the shapes of the joint end portions 41, 46.

Further, all of the first-fourth edges 43a-43d, respectively, of the joint end portion 41 and the first-fourth edges 47a-47d, respectively, of the joint end portion 46 extend straight. Therefore, when welding work is performed using, for example, a welding robot, the welding robot needs to be moved only circumferentially of the connecting arm portion 25a and the second down tubes 35a, 35b. This is convenient in promoting automation of the welding work and facilitating control relating to the movement of the welding robot.

Figure 11:
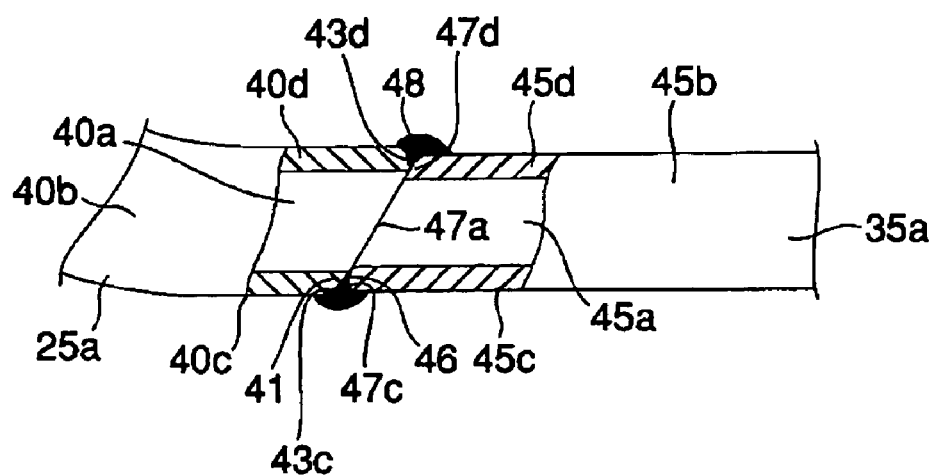
FIG. 11 is a sectional view showing the joint portion of the connecting arm portion of the first down tube and the second down tube in a second embodiment of the present invention.

Furthermore, the joint end portion 41 of the connecting arm portion 25a is cut obliquely so as to be directed outward in the lateral direction of the vehicle relative to the connecting arm portion 25a. Therefore, when the second down tube 35a is connected to the connecting arm portion 25a, the joint end portion 46 of the second down tube 35a can be brought in abutment against the joint end portion 41 of the connecting arm portion 25a from the left side in the lateral direction of the vehicle. As a result, the working efficiency in assembling the frame 2 is improved This invention is not limited to the foregoing first embodiment, but a second embodiment of this invention is shown in FIG. 11.

In the second embodiment, there is no component corresponding to the backing strip in the joint end portion 41 of the connecting arm portion 25a. The joint end portion 41 of the connecting arm portion 25a and the joint end portion 46 of the second down tube 35a are simply in abutment against each other.

In this arrangement, four edges of the joint end portions 41, 46 are also inclined, so that a sufficient welding length between the joint end portions 41, 46 can be secured.

This invention is not limited to the joint portion of the first down tube and the second down tube. For example, when one rectangular tube-like frame member passing above the engine is divided longitudinally, this invention may be applied to the portion at which the divided ends are welded to each other.

Further, this invention is not limited to a motorcycle, but may also be practiced, for example, in an All Terrain Vehicle (ATV), for running rough grounds, with three or four wheels.

The invention claimed is:

1. A frame for a vehicle, comprising:
 a first frame member having a square joint end portion; and
 a second frame member having a square joint end portion, wherein
 the joint end portion of the first frame member and the joint end portion of the second frame member are butt-welded to each other,
 the joint end portions of the first and second frame members each has circumferentially continuous first-fourth edges
 the first and second edges of each of the first and second frame members are spaced apart in a longitudinal direction and are inclined relative to a horizontal plane in a front or a rear view, and
 the third and fourth edges of each of the first and second frame members are spaced apart in a lateral direction and are inclined relative to the horizontal plane in a side view.

2. A frame for a vehicle, comprising:

a first frame member having a square joint end portion and a projection protruding from the joint end portion; and a second frame member having a square joint end portion and a hollow in which the projection of the first frame member is inserted, wherein the joint end portion of the first frame member and the joint end portion of the second frame member are butt-welded to each other, the joint end portions of the first and second frame members each has circumferentially continuous first-fourth edges, the first and second edges of each of the first and second frame members are spaced apart in a longitudinal direction and are inclined relative to a horizontal plane in a front or a rear view, and the third and fourth edges of each of the first and second frame members are spaced apart in a lateral direction and are inclined relative to the horizontal plane in a side view.

3. The frame for a vehicle according to claim 1, wherein the first-fourth edges of each of the joint end portions are located on a same plane.

4. The frame for a vehicle according to claim 1, wherein the joint end portion of the first frame member and the joint end portion of the second frame member are welded throughout the circumference.

5. The frame for a vehicle according to claim 1, wherein the first and second edges, and the third and fourth edges of each of the joint end portions face each other in radial directions of the first and second frame members, respectively, and the first edge and the second edge are inclined in a same direction and the third edge and the fourth edge are inclined in a same direction.

6. The frame for a vehicle according to claim 1, wherein the first-fourth edges of each of the joint end portions are inclined to a plane perpendicular to an axis passing through a center of each joint end portion.

7. The frame for a vehicle according to claim 2, wherein the first-fourth edges of each of the joint end portions are located on a same plane.

8. The frame for a vehicle according to claim 2, wherein the joint end portion of the first frame member and the joint end portion of the second frame member are welded throughout the circumference.

9. The frame for a vehicle according to claim 3, wherein the joint end portion of the first frame member and the joint end portion of the second frame member are welded throughout the circumference.

10. The frame for a vehicle according to claim 2, wherein the first and second edges, and the third and fourth edges of each of the joint end portions face each other in radial directions of the first and second frame members, respectively, and the first edge and the second edge are inclined in a same direction and the third edge and the fourth edge are inclined in a same direction.

11. The frame for a vehicle according to claim 2, wherein the first-fourth edges of each of the joint end portions are inclined to a plane perpendicular to an axis passing through a center of each joint end portion.

12. The frame for a vehicle according to claim 5, wherein the first-fourth edges of each of the joint end portions are inclined to a plane perpendicular to an axis passing through a center of each joint end portion.

13. A method for manufacturing a frame for a vehicle, comprising:

providing a first frame member with a square joint end portion;

providing a second frame member with a square joint end portion;

butt-welding the joint end portion of the first frame member and the joint end portion of the second frame member to each other; and providing the joint end portions of the first and second frame members with circumferentially continuous first-fourth edges; wherein the first and second frame members are butt-welded to each other with their respective circumferentially continuous first-fourth edges butted, the first and second edges of each of the first and second frame members are spaced apart in a longitudinal direction and are inclined relative to a horizontal plane in a front or a rear view, and the third and fourth edges of each of the first and second frame members are spaced apart in a lateral direction and are inclined relative to the horizontal plane in a side view.

14. The method for manufacturing a frame for a vehicle according to claim 13, further comprising positioning the first-fourth edges of each of the joint end portions on a same plane.

15. The method for manufacturing a frame for a vehicle according to claim 13, further comprising welding the joint end portion of the first frame member and the joint end portion of the second frame member throughout the circumference.

16. The method for manufacturing a frame for a vehicle according to claim 13, further comprising positioning the first and second edges, and the third and fourth edges of each of the joint end portions to face each other in radial directions of the first and second frame members, respectively, and having the first edge and the second edge inclined in a same direction and the third edge and the fourth edge inclined in a same direction.

17. The method for manufacturing a frame for a vehicle according to claim 13, further comprising having the first-fourth edges of each of the joint end portions inclined to a plane perpendicular to an axis passing through a center of each joint end portion.

18. The frame for a vehicle according to claim 1, wherein the first-fourth edges of the joint end portion of the first frame member is cut obliquely so as to be directed leftward and rearward of the frame and the first-fourth edges of the joint end portion of the second frame member is cut obliquely so as to be directed rightward and forward of the frame.

19. The frame for a vehicle according to claim 2, wherein the first-fourth edges of the joint end portion of the first frame member is cut obliquely so as to be directed leftward and rearward of the frame and the first-fourth edges of the joint end portion of the second frame member is cut obliquely so as to be directed rightward and forward of the frame.

20. The method for manufacturing a frame for a vehicle according to claim 13, further comprising having the first-fourth edges of the joint end portion of the first frame member cut obliquely so as to be directed leftward and rearward of the frame and having the first-fourth edges of the joint end portion of the second frame member cut obliquely so as to be directed rightward and forward of the frame.

* * * * *